United States Patent
Vittozzi et al.

(10) Patent No.: US 7,062,954 B2
(45) Date of Patent: Jun. 20, 2006

(54) LEAK DETECTOR

(75) Inventors: Sandro Vittozzi, Turin (IT); Roberto Carboneri, Settimo Torinese (IT)

(73) Assignee: Varian, S.p.A., Turin (IT)

( * ) Notice: Subject to any disclaimer, the term of this patent is extended or adjusted under 35 U.S.C. 154(b) by 0 days.

(21) Appl. No.: 11/034,123

(22) Filed: Jan. 12, 2005

(65) Prior Publication Data

US 2005/0150274 A1 Jul. 14, 2005

(30) Foreign Application Priority Data

Jan. 13, 2004 (EP) .................................. 04425010

(51) Int. Cl.
*G01M 3/20* (2006.01)
(52) U.S. Cl. ........................................ 73/40.7; 73/1.07
(58) Field of Classification Search ................. 73/40.7, 73/1.07
See application file for complete search history.

(56) References Cited

U.S. PATENT DOCUMENTS

| | | | |
|---|---|---|---|
| 3,444,721 A * | 5/1969 | Hearn et al. .................. | 73/23.2 |
| 3,672,207 A * | 6/1972 | Cramp et al. ................. | 73/40.7 |
| 3,902,068 A * | 8/1975 | Wood .......................... | 250/343 |
| 3,914,983 A * | 10/1975 | Umezu ......................... | 73/40.7 |
| 4,754,638 A * | 7/1988 | Brayman et al. ............ | 73/40.7 |

FOREIGN PATENT DOCUMENTS

| EP | 0 352 371 B2 | | 3/1996 |
|---|---|---|---|
| GB | 2056091 A | * | 3/1981 |

\* cited by examiner

Primary Examiner—Michael Cygan
(74) Attorney, Agent, or Firm—Bella Fishman

(57) ABSTRACT

A leak detector comprises a high vacuum envelope connected with a vacuum pump to bring the vacuum envelope to a pressure sensibly lower than ambient pressure. At least a portion of the envelope is separated from an external environment through a quartz membrane associated with an electrical resistor, which heats the membrane to a sufficient temperature in order to make it permeable to a corresponding test gas (in particular, helium). In operation, an electronic control unit detects variations in the current absorbed by the vacuum pump and consequently signals the test gas diffusion into the chamber and hence the existence of a leak. A sampling line with a sampling pump disposed therein is connected to a probe for the intake of gas directed to expose to the membrane. The gas is discharged to the outside through a discharge line. A system for switching between the gas intake and exhaust is provided, in order to quickly eliminates any test gas trace from said detector. Purging cycle actuation is provided manually or automatically.

17 Claims, 2 Drawing Sheets

LEAK DETECTOR

CROSS-REFERENCE TO RELATED APPLICATION

The subject patent application is claiming the priority of the European patent application No. 04425010.8, which was filed on Jan. 13, 2004.

FIELD OF THE INVENTION

The present invention relates to a leak detector.

More particularly, the present invention concerns a leak detector of the kind using a membrane, which is made of material selectively permeable to a test gas, when heated.

BACKGROUND OF THE INVENTION

Detectors of the above type generally comprise a high vacuum envelope connected with a vacuum pump to bring the envelope to a pressure sensibly lower than ambient pressure. At least a portion of the envelope is separated from the external environment through a wall or membrane of a material selectively permeable to a test gas, such as for instance quartz or glass with high silica content (>80%).

The membrane may be implemented as a capillary tube or planar or arched window.

An electrical resistor located within the membrane and connected to an electric power supply allows for bringing the membrane to a temperature of at least 300° C., where the glass with high silica content is permeable only to helium.

An electronic control unit of the vacuum pump is capable of detecting variations in the electrical current absorbed by the pump and consequently of signalling the test gas diffusion into the vacuum envelope and hence the existence of a leak.

Such a detector is disclosed for instance in patent EP 352,371 in the name of the Applicant.

According to the prior art, the leak detector further comprises a sampling line for the intake of a gas coming from a probe or a sniffer. This gas is directed to a membrane to come to a contact therewith. The gas exposed to the membrane is directed to a discharge line to be exhausted to the outside. The sampling line also comprises a suction pump to suck a greater gas amount through the probe. The pump is generally located between the probe and the membrane.

Leak detectors are generally used to check the tightness of containers, reservoirs, packages etc., often in a quick sequence, such as, for instance, during production and packaging industrial processes.

Consequently, the leak detector has to rapidly recover the initial operating conditions, immediately after the detection of a leak, so as to be ready for a further measurement.

One of the problems to be solved in leak detectors utilising in manufacturing processes is thus how to quickly purge the feeding and discharge lines so as to remove any residual test gas possibly present in the detector before starting a further test.

A known method of purging the leak detector comprises the step of passing clean air. without test gas, through the detector. Such operation can be obtained for instance by moving the detector or the probe, or sniffer from the test zone to a neutral zone where clean air is present.

That method is however complex and considerably time consuming; moreover, it can be applied only to portable leak detectors, whereas it cannot be used in case of detectors that are located along a working line.

It is a main object of the present invention to overcome the above drawback by providing a leak detector and a method of its operation, which allows for effective purging of the sampling and discharge line.

Another problem in prior art leak detectors is the risk of saturation because of very high concentrations of test gas inside the vacuum envelope. Actually, an excessive amount of test gas inside the envelope requires a long time for being evacuated by the vacuum pump and hence delays the reset of the operating condition in order to start a further test.

It is another object of the present invention to provide a leak detector comprising a purging system that allows for avoiding excessive test gas concentrations in the detector.

The above and other objectives achieved by a leak detector and method of its operation as claimed in the appended claims.

SUMMARY OF THE INVENTION

Advantageously, due to the presence of a system for switching between the gas intake and exhaust and a method of its operation, it is possible to quickly eliminate any test gas trace from the sampling and discharge lines and, in particular, from the area near the membrane, which is made of the material selectively permeable to the test gas.

The switching between the gas intake and exhaust can advantageously be performed utilizing a four-way valve, preferably an electric valve. In the alternative, several valves and suitable connecting ducts may be provided.

In a preferred embodiment, a control device mounted on the detector can automatically actuate said valve(s) so as to avoid excessive test gas concentrations inside the detector.

BRIEF DESCRIPTION OF THE DRAWINGS

An exemplary embodiment of the invention, given by way of non-limiting example, will be described hereinafter with reference to the accompanying drawings, in which.

DETAILED DESCRIPTION OF THE INVENTION

Figure 1A:
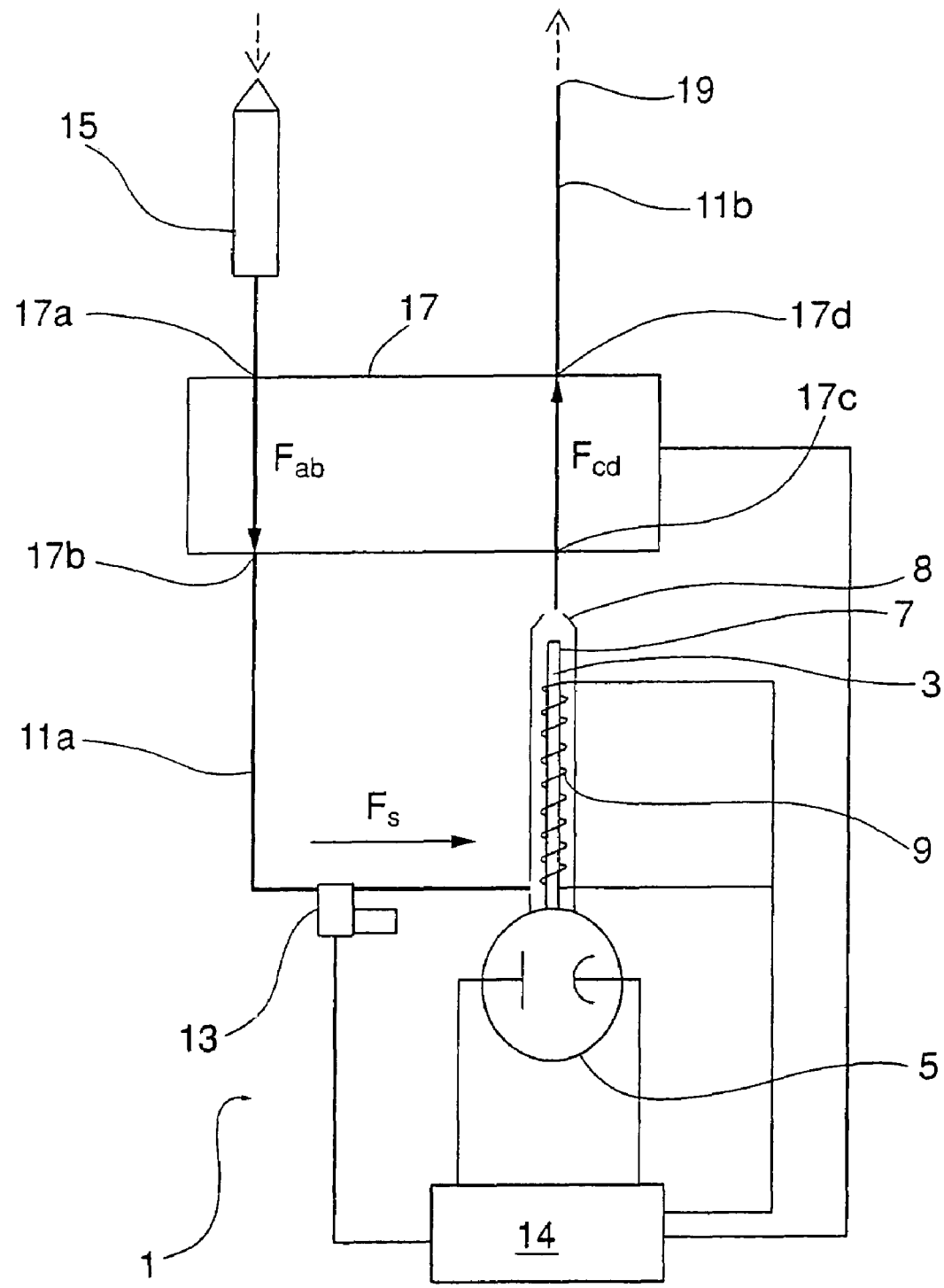
FIG. 1a is a schematic representation of the leak detector according to the invention, in measuring mode.
Figure 1B:
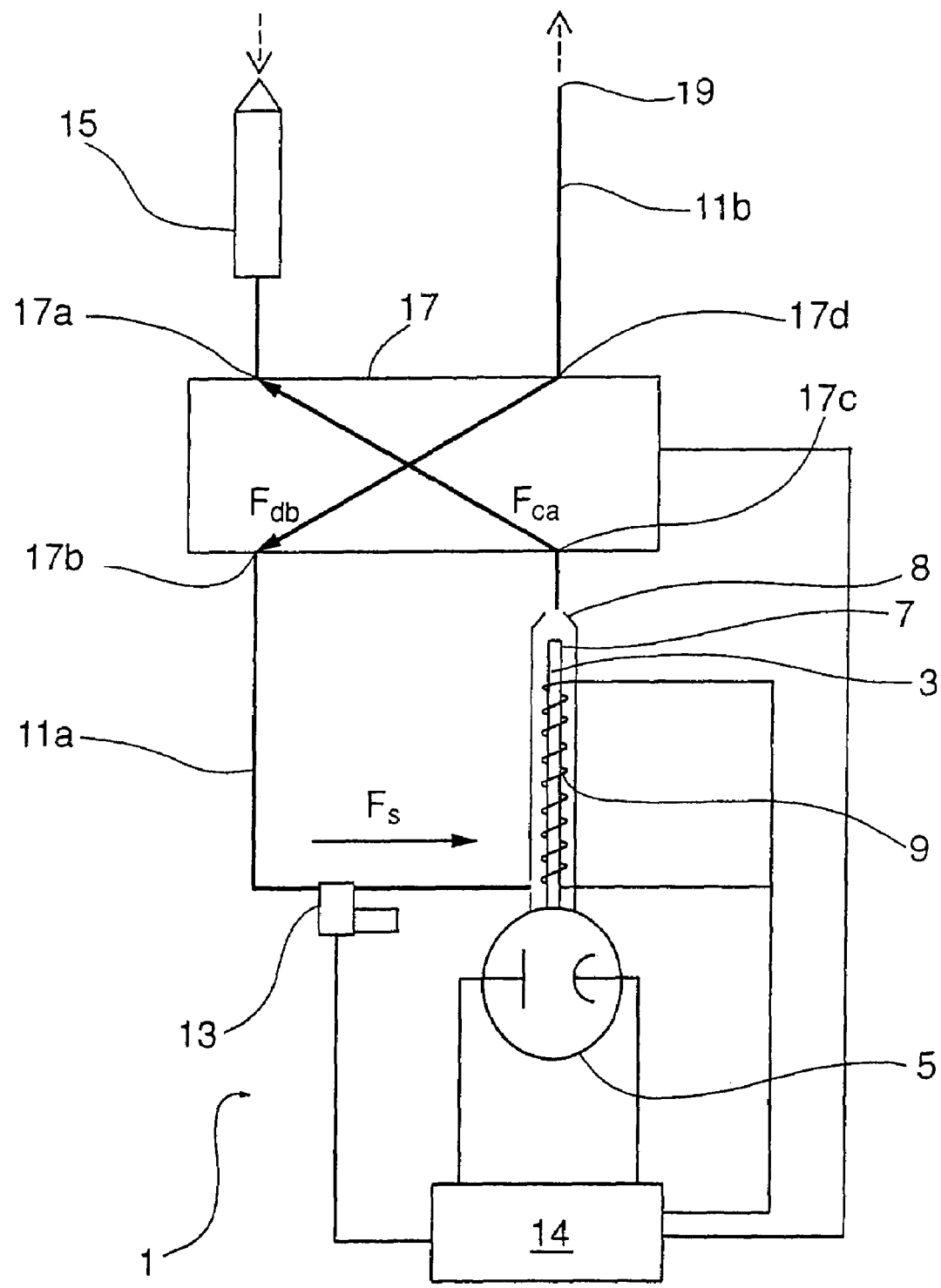
FIG. 1b is a schematic representation of the leak detector according to the invention, in purging mode.

Referring to FIGS. 1a and 1b, detector 1 according to the invention comprises a vacuum envelope 3 defined inside a high vacuum capillary tube 7, preferably made of a glass with high silica content and connected at its bottom to the suction port of a vacuum pump 5, e.g. an ionic pump.

The capillary tube 7 is located within a protecting bell 8, comprising for instance a couple of coaxial tubes of stainless steel and glass and having a radial inlet opening at its bottom and an axial outlet opening at its top. Of course, different arrangements are possible for said inlet and/or outlet openings: for instance, both openings can be radial or axial openings, or their locations can be reversed so that gas enters from the top in FIGS. 1a and 1b.

The inlet opening of bell 8 receives sampling line 11a which starts at a probe or sniffer 15 located near the zone where the test is to be carried out.

A sampling pump 13, powered by electronic control unit 14, is further provided between said probe 15 and bell 8 to suck gas through this probe 15 and discharge it into bell 8 where it contacts the wall of capillary tube membrane 7.

The outlet opening of bell 8 is connected to discharge line 11b which ends at a port 19 for gas exhaust towards the outside environment.

An electric resistor 9, connected to electronic control unit 14 from which it is powered, is wound around capillary tube 7.

Due to resistor 9, the capillary tube temperature can be raised up to the range 300° C. to 900° C., where the glass with high silica content is permeable to helium.

The presence of test gas in vacuum envelope 3, and hence of leaks, is detected by measuring variations in the current absorbed by vacuum pump 5 connected to electronic control unit 14.

Advantageously, according to the invention, leak detector 1 has a system for switching between air intake and exhaust. In the embodiment shown, the system comprises a single four-way valve 17 arranged along sampling line 11a and discharge line 11b.

Due to the four-way valve 17, and as it will become apparent from the following description, sampling pump 13 can suck air through probe 15 and discharge it through port 19 (working operating condition), or it can suck air through port 19 and discharge it through probe 15 (purging operating condition).

In the embodiment shown, a four-way valve 17, preferably an electric valve, is arranged along sampling line 11a and discharge line 11b, and is so located that a first port pair 17a, 17b of the valve is arranged on the sampling line 11a, between the probe 15 and the bell 8 and preferably upstream sampling pump 13, and a second port pair 17c, 17d of the valve is arranged on the discharge line 11b, between the bell 8 and the exhaust port 19.

Referring in particular to FIG. 1a, detector system according to the invention is shown during normal working operation, in test mode.

During normal operation, an ambient gas possibly charged with test gas is sucked through probe 15 by means of sampling pump 13 and it flows through valve 17, entering through a first port 17a and flowing out through a second port 17b, as shown by arrow $F_{ab}$. After having flown through bell 8 and exposed to capillary tube 7, the stream of the ambient gas and possibly test gas flows again through valve 17, entering through a third port 17c and flowing out through a fourth port 17d, as shown by arrow $F_{cd}$.

Turning now to FIG. 1b, leak detector 1 according to the invention is shown in a sampling and a discharge line purging mode.

For purging, valve 17 is actuated so as to establish communication between ports 17a and 17c, and 17d and 17b, respectively.

In this way, sucking of the ambient air without the test gas through exhaust port 19 and evacuation through probe 15 is made possible. The clean air stream flows through valve 17, entering through the fourth port 17d and flowing out through the second port 17b, as shown by arrow $F_{db}$. After having flown through bell 8 and exposed to capillary tube 7, the air, which has now become charged with test gas residuals, flows again through valve 17, entering through said third port 17c and flowing out through said first port 17a, as shown by arrow $F_{ca}$. In this manner, the clean air stream purges test gas residuals from the whole sampling and discharge lines 11a, 11b, and in particular from bell 8 housing capillary tube 7.

By a comparison of FIGS. 1a and 1b, it can be appreciated that the air stream advantageously flows through sampling pump 13 and bell 8 in the same direction, shown by arrow $F_s$, in both operating modes; advantageously, such an arrangement allows dispensing with use of a reversible sampling pump 13.

Valve 17 can be manually actuated by the operator, for instance at the end of each measurement cycle.

In a preferred embodiment, however, said valve 17 may be automatically actuated by supply and control unit 14, for instance in order to avoid excessive test gas concentrations in the detector, which would result in a quick saturation of vacuum envelope 3 within capillary tube 7.

In this situation unit 14 commands switching between air intake and exhaust when a threshold value related to test gas concentration (preferably related to the time derivative thereof and hence representative of the rate at which test gas concentration is increasing) is exceeded.

In order to make the detector stable and to avoid multiple actuation of valve 17 in quick succession if a quick succession of small variations occurs in test gas concentration, the starting of the purging cycle and the subsequent reset to the normal operating conditions could occur according to a hysteresis cycle. In such case, two threshold values $V_1 > V_2$ will be defined such that the purging cycle is started when the increased rate of test gas concentration exceeds $V_1$, whereas the test cycle is started again when this rate falls below value $V_2$.

Additionally to the above-described control logic, electronic control unit 14 might intermittently operate valve 17 according to a given time law.

For instance the control unit 14 might control valve 17 so as to alternate intervals $T_P$, in which detector operates normally by sucking air through probe 15 (test cycle), with intervals $T_L$ in which detector operates according to the purging cycle by sucking clean air through exhaust port 19.

Further in accordance with this embodiment of the invention, the interval $T_P$ could be deliberately extended as soon as control unit 14 detects a gas concentration increase in vacuum envelope 3, thereby allowing an accurate signalling of the leak. Similar, the interval $T_P$ could be deliberately shortened in case of excessive test gas concentrations in the detector, in order to avoid saturation of capillary tube 7.

Preferably, according to the invention, both the manual and the automatic purging cycle actuation is accompanied by a turning off heating means 9. Thus, capillary tube 7 is impermeable to helium and the clean air stream coming from exhaust port 19 can quickly remove test gas traces without any further permeation of the test gas into vacuum envelope 3. Once sampling and discharge lines 11a, 11b and the bell 8 have been purged, test gas residuals trapped in the wall of capillary tube 7 can be evacuated by vacuum pump 5, after heating means 9 have been turned on again.

Alternatively, even without waiting for a complete purging of the sampling and discharge line, during the purging cycle electric resistor 9 might be turned on again, even to higher temperatures than during normal operation, so that clean air coming from the exhaust port also contributes to purging the capillary tube walls.

It is clear that the above description has been given only by way of non limiting example and that changes and modifications, in particular concerning the means employed to perform the switching between air intake and discharge, are possible without departing from the scope of the invention.

What is claimed is:

1. A leak detector comprising:
   a vacuum envelope (3);

a vacuum pump(5), which brings said vacuum envelope to a pressure substantially lower than ambient pressure;

a membrane (7) being made of a material selectively permeable to a test gas separating at least a portion of said vacuum envelope from an external environment;

a heater (9), which heats said membrane to a temperature at which the material of said membrane being permeable to the test gas;

an electronic control unit (14) detecting current absorbed by said pump, the variation of the current being an indicator of diffusion of the test gas into said vacuum envelope;

a probe (15), which intakes an ambient gas;

a sampling pump (13), which sucks the ambient gas through said probe;

a gas sampling line (11*a*) directing the ambient gas to said membrane;

a discharge line (11*b*) exhausting the gas from said membrane via an exhaust port (19); and a switching system, which reverses an intake and an exhaust of the gas switching a working operation to a purging operation.

2. The leak detector of claim 1, wherein said switching system comprises a four-way valve (17) disposed along said gas sampling and discharge lines;

wherein in the working operation the ambient gas containing the test gas is sucked through the probe (15) and is discharged through the exhaust port (19), and wherein in the purging operation the ambient gas without test gas is sucked through the exhaust port (19) and discharged through the probe (15).

3. The leak detector of claim 2, wherein said four-way valve (17) comprises:

a first pair of ports (17*a*, 17*b*), which is disposed between said probe (15) and said membrane (7) at said sampling line (11*a*), and a second pair of ports (17*c*, 17*d*), which is disposed between said membrane (7) and said exhaust port (19) at said discharge line (11*b*).

4. The leak detector of claim 3, wherein, during the working operation, the ambient gas containing the test gas enters through a first port (17*a*), flows out through a second port (17*b*) contacting the membrane (7), enters through a third port (17*c*) and flows out through a fourth port (17*d*).

5. The leak detector of claim 3, wherein, during the purging operation, the ambient gas without test gas enters through a fourth port (17*d*), flows out through a second port (17*b*) exposing the membrane (7), enters through a third port (17*c*) and flows out through a first port (17*a*).

6. The leak detector of claim 5, wherein said four-way valve (17) is actuated manually by an operator.

7. The leak detector of claim 5, wherein said four-way valve (17) is automatically controlled by said electronic control unit (14) depending on one or more control parameters chosen out of operating parameters of the leak detector.

8. The leak detector as claimed in claim 7, wherein one of said control parameters is proportional to the test gas concentration in said vacuum envelope (3).

9. The leak detector as claimed in claim 7, wherein one of said control parameters is an increased rate of the concentration of the test gas in said vacuum envelope (3).

10. The leak detector of claim 5, wherein said valve (17) is automatically actuated by electronic control unit alternating intervals ($T_P$) corresponding to test cycles, in which the ambient gas with the test gas is sucking through the probe (15), with intervals ($T_L$) corresponding to the purging operation, in which the ambient gas without the test gas is sucking through the exhaust port (19).

11. A method for leak detection comprising the steps of:

providing a four-way valve having first and second pairs of ports, which are disposed respectively within a sampling line between a probe and a membrane, and within a discharge line;

sucking an ambient air containing a test gas through the probe via the first pair of ports for its exposure to a vacuum envelope with a membrane made of a material selectively permeable to the test gas and discharging it via the second pair of ports to an exhaust port of the discharge line; and purging the sampling and discharge lines by reversing the intake and exhaust of the gas by sucking the ambient air without the test gas through the exhaust port of the discharge line, via the four-way valve and exhausting it through the probe.

12. The method of leak detection of claim 11, wherein the step of purging further comprising entering the ambient air through a second port of the second pair of ports, flowing out of a second port of the first pair, contacting the membrane, then entering through a first port of the second pair and flowing through a first port of the first pair.

13. The methods of leak detection of claim 12, further comprising the step of actuating the four-way valve manually by an operator.

14. The method of leak detection of claim 12, further comprising the step of controlling the four-wavy valve automatically by an electronic control unit depending on one or more control parameters chosen our of operating parameters of a leak detector performing leak detection.

15. The method of leak detection of claim 14, wherein said control parameters is proportional to the test gas concentration in the vacuum envelope.

16. The method of leak detection of claim 14, wherein one of said control parameters is an increased rate of the concentration of the test gas in the vacuum envelope.

17. The method of leak detection of claim 14, wherein the step of controlling further comprising alternating intervals ($T_P$) corresponding to test cycles, in which the ambient gas with the test gas is sucking through the probe with intervals ($T_L$) corresponding to the purging operation, in which the ambient gas without the test gas is sucking through the second port of the second pair of ports of the four-way valve.

* * * * *